(12) United States Patent
Matsuo

(10) Patent No.: US 8,539,923 B2
(45) Date of Patent: *Sep. 24, 2013

(54) POWER UNIT FOR VEHICLE

(75) Inventor: Kenji Matsuo, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 707 days.

This patent is subject to a terminal disclaimer.

(21) Appl. No.: 12/711,650

(22) Filed: Feb. 24, 2010

(65) Prior Publication Data

US 2010/0229816 A1 Sep. 16, 2010

(30) Foreign Application Priority Data

Mar. 12, 2009 (JP) ................. 2009-060010

(51) Int. Cl.
*F02N 11/08* (2006.01)

(52) U.S. Cl.
USPC .............. 123/179.3; 123/400; 123/179.25; 74/325

(58) Field of Classification Search
USPC ........ 123/179.1, 179.3, 179.4, 179.5, 179.25, 123/400; 903/904, 909; 477/5, 70; 74/9, 74/325, 473.36

See application file for complete search history.

(56) References Cited

U.S. PATENT DOCUMENTS

| 2005/0211481 A1* | 9/2005 | Sasamoto .................... 180/65.2 |
| 2007/0075521 A1* | 4/2007 | Ogasawara et al. ........... 280/291 |
| 2007/0267240 A1* | 11/2007 | Inui et al. ...................... 180/291 |
| 2010/0077884 A1* | 4/2010 | Ono et al. ................... 74/473.36 |
| 2010/0229814 A1* | 9/2010 | Matsuo et al. ............. 123/179.3 |

FOREIGN PATENT DOCUMENTS

| JP | 63-203494 A | 8/1988 |
| JP | 2007-269253 A | 10/2007 |
| JP | 2008-239125 A | 10/2008 |

* cited by examiner

*Primary Examiner* — Stephen K Cronin
*Assistant Examiner* — Sherman Manley
(74) *Attorney, Agent, or Firm* — Birch, Stewart, Kolasch & Birch, LLP

(57) ABSTRACT

A speed reducing gear train includes a starter driven gear, a starting one-way clutch interposed between the starter driven gear and a crankshaft for permitting power transmission from the starter driven gear to the side of the crankshaft. The speed reducing gear train and the starting one-way clutch being provided between a starter motor and the crankshaft with a transmission accommodated in a crankcase. The transmission includes gear trains for selectively establishing a plurality of gear speeds with the gear trains being between a main shaft and a counter shaft. The starter motor can produce power for driving the vehicle and to impart a drive assisting force. A power transmitting gear meshing with the starter driven gear is relatively rotatably mounted on the main shaft through a running one-way clutch permitting power transmission from the power transmitting gear to the side of the main shaft.

14 Claims, 2 Drawing Sheets

POWER UNIT FOR VEHICLE

CROSS-REFERENCE TO RELATED APPLICATIONS

The present application claims priority under 35 USC 119 to Japanese Patent Application No. 2009-060010 filed on Mar. 12, 2009 the entire contents of which are hereby incorporated by reference.

BACKGROUND OF THE INVENTION

1. Field of the Invention

The present invention relates to a vehicle power unit including a speed reducing gear train including a starter driven gear relatively rotatably borne on a crankshaft rotatably borne on a crankcase constituting part of an engine body, a starting one-way clutch interposed between the starter driven gear and the crankshaft so as to permit power transmission from the starter driven gear to the crankshaft side, the speed reducing gear train and the starting one-way clutch being provided between a starter motor mounted to the engine body and the crankshaft with a transmission accommodated in the crankcase. The transmission includes gear trains for a plurality of gear speeds which can be selectively established, the gear trains being provided between a main shaft and a counter shaft which have axes parallel to the crankshaft.

2. Description of Background Art

A hybrid type motorcycle is known wherein an electric motor for exclusive use for imparting a torque to a power transmission system including a crankshaft of an engine mounted on the motorcycle is provided separately from a starter motor for imparting a starting torque to the crankshaft. See, for example, Japanese Patent Laid-Open No. 2007-269253.

In the motorcycle disclosed in Japanese Patent Laid-Open No. 2007-269253, however, the electric motor for exclusive use for imparting a torque to the power transmission system is needed, in addition to the starter motor. Therefore, the number of component parts is increased. In addition, the exclusive-use power transmission mechanisms have to be provided respectively for the starter motor and for the electric motor. This leads to a complicated structure and an enlarged power unit.

SUMMARY AND OBJECTS OF THE INVENTION

The present invention has been made in consideration of the above-mentioned circumstances. Accordingly, it is an object of an embodiment of the present invention to provide a vehicle power unit configured to be of a hybrid type with a simple structure with a reduction in the number of component parts while making it possible, with a starter motor, to produce vehicle-driving power and to impart a drive-assisting force.

According to an embodiment of the present invention, a vehicle power unit includes a speed reducing gear train including a starter driven gear relatively rotatably borne on a crankshaft rotatably borne on a crankcase constituting part of an engine body. A starting one-way clutch is interposed between the starter driven gear and the crankshaft so as to permit power transmission from the starter driven gear to the side of the crankshaft. The speed reducing gear train and the starting one-way clutch are provided between a starter motor mounted to the engine body and the crankshaft, and a transmission accommodated in the crankcase with the transmission having gear trains for a plurality of gear speeds which can be selectively established. The gear trains are provided between a main shaft and a counter shaft which have axes parallel to the crankshaft, a power transmitting gear meshing with the starter driven gear is relatively rotatably borne on the main shaft through a running one-way clutch for permitting power transmission from the power transmitting gear to the side of the main shaft.

According to an embodiment of the present invention, a power transmission change-over mechanism for change-over between power transmission from the crankshaft to the main shaft and cutoff of the power transmission is provided between the crankshaft and the main shaft.

According to an embodiment of the present invention, the starter driven gear includes a rotary member relatively rotatably borne on the crankshaft through the starting one-way clutch interposed between the rotary member and the crankshaft, a gear member relatively rotatably borne on the crankshaft and meshing with the power transmitting gear, and a shifter which is borne on the rotary member so as to be capable of relative movement in the direction along the axis of the crankshaft and to be incapable of relative rotation and which has a dog disengageably engaged with the gear member.

In addition, in an embodiment of the present invention a first main shaft 44 is provided together with a first hydraulic clutch 52 corresponding to the power transmission change-over mechanism and a first-speed gear train G1 and a third-speed gear train G3 corresponding to the gear trains in the invention.

According to an embodiment of the present invention, the starter driven gear constituting part of the speed reducing gear train and accompanied by the starting one-way clutch interposed between itself and the crankshaft meshes with the power transmitting gear relatively rotatably borne on the main shaft through the running one-way clutch which permits power transmission to the main shaft side. Therefore, in the condition where the starter driven gear is driven to rotate by an operation of the starter motor and where the rotating speed of the power transmitting gear meshing with the starter driven gear is higher than the rotating speed of the main shaft rotated by the power transmitted from the crankshaft, rotational power can be imparted from the power transmitting gear to the main shaft. Consequently, both driving of the vehicle by the starter motor and power assisting by the starter motor can be performed. Thus, the power unit can be configured to be of a hybrid type with a simple structure, without the addition of a large number of component parts.

In addition, according to an embodiment of the present invention, a condition where the vehicle is driven by only the driving force of the starter motor can be realized by setting the power transmission change-over mechanism provided between the crankshaft and the main shaft into the power transmission cutting-off state.

Furthermore, according to an embodiment of the present invention, the starter driven gear is composed of the rotary member, the gear member and the shifter, and the dog possessed by the shifter is disengageably engaged with the gear member. Therefore, a condition where the rotary member and the gear member are connected with each other in a relatively non-rotatable manner and a condition where these members are disconnected from each other can be changed over from one to the other, power transmission from the starter motor to the crankshaft can be cut off, and the influence of friction on the engine side can be minimized in the condition where the vehicle is driven by only the driving force of the starter motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below, based on the accompanying drawings.

Figure 1:
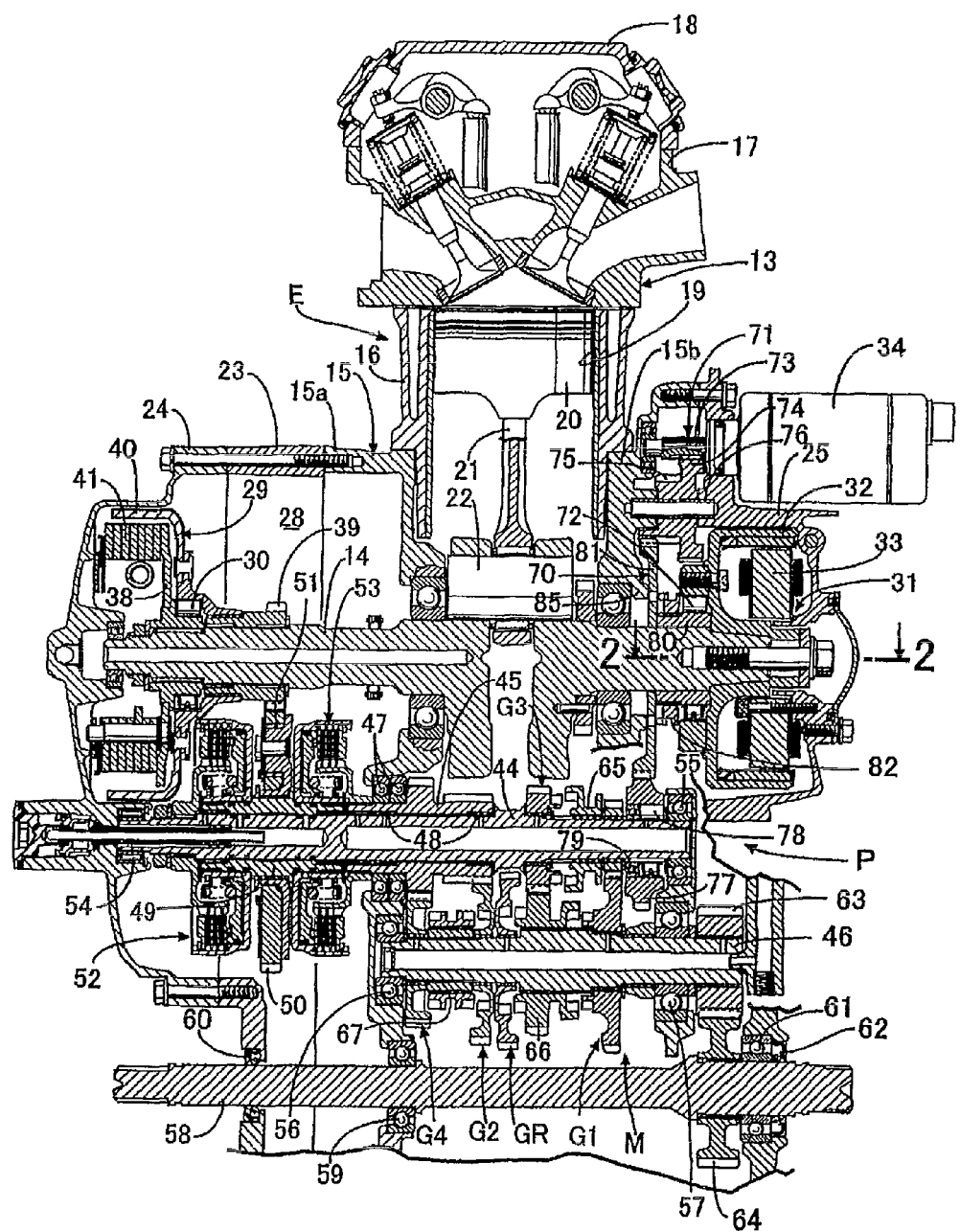
FIG. 1 is a longitudinal sectional view of a power unit.

Referring to FIG. 1, Example 1 of the present invention will be described. The power unit P has an engine E and a transmission M, and is mounted on a vehicle, for example, an all-terrain vehicle (ATV). An engine body 13 of the engine E includes a crankcase 15 for rotatably bearing a crankshaft 14 having an axis set along the front-rear direction, a cylinder 16 connected to an upper portion of the crankcase 15, a cylinder head 17 connected to an upper portion of the cylinder 16, and a head cover 18 connected to an upper portion of the cylinder head 17, wherein a piston 20 slidably fitted in a cylinder bore 19 of the cylinder 16 is connected to the crankshaft 14 through a connecting rod 21 and a crank pin 22.

The crankcase 15 is composed of a pair of case halves 15a and 15b coupled to each other at a plane orthogonal to the rotational axis of the crankshaft 14. First and second crankcase covers 23 and 24 are fastened to one side of the crankcase 15 so that the first crankcase cover 23 is clamped between the second crankcase cover 24 and the case half 15a. A third crankcase cover 25 is fastened to the other side of the crankcase 15. A clutch accommodation chamber 28 is formed between the crankcase 15 and the second crankcase cover 24. The first to third crankcase covers 23, 24 and 25 also constitute part of the engine body 13.

One end of the crankshaft 14 which protrudes from the crankcase 15 is rotatably borne on the second crankcase cover 24. A centrifugal clutch 29 accommodated in the clutch accommodation chamber 28 is mounted to one end portion of the crankshaft 14 at a position close to the second crankcase cover 24, through a one-way clutch 30. A rotor 32 of a generator 31 disposed between the crankcase 15 and the third crankcase cover 25 is connected to an other end portion of the crankshaft 14 which protrudes from the crankcase 15, whereas a stator 33 of the generator 31 is fixed to the third crankcase cover 25. In addition, a starter motor 34 is mounted to the third crankcase cover 25 in such a manner so as to have a rotational axis parallel to the crankshaft 14.

The centrifugal clutch 29 includes a drive plate 38 fixed to the crankshaft 14, a cup-shaped clutch housing 40 which coaxially covers the drive plate 38 so as to be rotated together with a drive gear 39 relatively rotatably mounted on the crankshaft 14, and a clutch weight 41 turnably borne on the drive plate 38 so as to be capable of frictional engagement with the inner periphery of the clutch housing 40 according to the action of a centrifugal force attendant on the rotation of the crankshaft 14. In addition, a one-way clutch 35 is provided between the clutch housing 40 and the drive plate 38 so as to permit transmission of a back torque from the drive gear 39 to the crankshaft 14.

The transmission M wherein gear trains for a plurality of gear speeds which can be selectively established, for example, a reverse gear train GR and forward gear trains for a plurality of speeds, for instance, first-speed to fourth-speed gear trains G1 to G4 are provided between first and second main shafts 44, 45 and a counter shaft 46, is accommodated in the crankcase 15. The first main shaft 44, the second main shaft 45 and the counter shaft 46 are disposed so as to have respective axes parallel to the crankshaft 14. The first and second main shafts 44 and 45 are coaxially disposed so as to be capable of relative rotation about the same axis. The first-speed gear train G1 and the third-speed gear train G3 are provided between the first main shaft 44 and the counter shaft 46, whereas the second-speed gear train G2, the fourth-speed gear train G4 and the reverse gear train GR are provided between the second main shaft 45 and the counter shaft 46. The reverse gear train GR is composed of a drive gear in the second-speed gear train G2, a reverse idle gear (not shown) having an input-side gear portion meshing with this drive gear, and a driven gear which is rotatably borne on the counter shaft 46 and meshes with an output-side gear portion of the reverse idle gear.

In addition, the first main shaft 44 penetrates, coaxially and in a relatively rotatable manner, the second main shaft 45 which is rotatably borne on the crankcase 15 through ball bearings 47, 47. A plurality of needle bearings 48 are interposed between the second main shaft 45 and the first main shaft 44. In addition, a one-end portion of the first main shaft 44 is rotatably borne on the second crankcase cover 24 through a roller bearing 54, and an other-end portion of the first main shaft 44 is rotatably borne on the crankcase half 15b of the crankcase 15 through a ball bearing 55. Furthermore, a one-end portion of the counter shaft 46 is rotatably borne on the case half 15a of the crankcase 15 through a ball bearing 56, and an other-end portion of the counter shaft 46 penetrates the case half 15b of the crankcase 15 in a rotatable manner, with a ball bearing 57 interposed between the counter shaft 46 and the case half 15b.

In the clutch accommodation chamber 28, a power transmission tubular shaft 49 is relatively rotatably mounted on the first main shaft 44. Rotational power from the crankshaft 14 is transmitted to the power transmission tubular shaft 49 through the centrifugal clutch 29, the drive gear 39, a driven gear 50 meshing with the drive gear 39, and a rubber damper 51. In addition, a first hydraulic clutch 52 as a power transmission change-over mechanism for change-over between power transmission from the crankshaft 14 to the first main shaft 44 and cutoff of the power transmission is provided between the power transmission tubular shaft 49 and the first main shaft 44. In addition, a second hydraulic clutch 53 for change-over between power transmission from the crankshaft 14 to the second main shaft 45 and cutoff of the power transmission is provided between the power transmission tubular shaft 49 and the second main shaft 45.

When the first hydraulic clutch 52 is in a power transmitting state and power is transmitted from the crankshaft 14 to the first main shaft 44, power is transmitted from the first main shaft 44 to the counter shaft 46 through an alternatively established one of the first-speed and third-speed gear trains G1 and G3. When the second hydraulic clutch 53 is in a power transmitting state and power is transmitted from the crankshaft 14 to the second main shaft 45, power is transmitted from the second main shaft 45 to the counter shaft 46 through an alternatively established one of the second-speed, fourth-speed and reverse gear trains G2, G4 and GR.

In addition, a one-side portion of an output shaft 58 connected to a drive wheel (not shown) and having an axis parallel to the rotational axis of the crankshaft 14 penetrates the case half 15a on one side of both the case halves 15a and 15b of the crankcase 15 and the first crankcase cover 23 in rotatable manner, whereas an other-side portion of the output shaft 58 penetrates the third crankcase cover 25 in a rotatable manner. A ball bearing 59 is interposed between the case half 15a and the output shaft 58, an annular seal member 60 is interposed between the first crankcase cover 23 and the output shaft 58, and a ball bearing 61 and an annular seal member 62 are interposed between the third crankcase cover 25 and the output shaft 58.

On the other hand, a drive gear 63 is fixed to an end portion of the counter shaft 46 which protrudes from the case half 15b on the other side of both the case halves 15a and 15b of the crankcase 15, and a driven gear 64 meshing with the drive gear 63 is provided on the output shaft 58. In other words, the counter shaft 46 is connected to the drive wheel through the drive gear 63, the driven gear 64 and the output shaft 58.

A first shifter 65 is borne on the first main shaft 44 in the transmission M in a relatively non-rotatable and axially slidable manner. Second and third shifters 66 and 67 are borne on the counter shaft 46 in a relatively non-rotatable and axially slidable manner. A condition of establishing the first-speed gear train G1, a condition of establishing the third-speed gear train G3 and a condition of establishing the reverse gear train GR can be alternatively changed over by the first and second shifters 65 and 66. A condition of establishing the second-speed gear train G2 and a condition of establishing the fourth-speed gear train G4 can be changed over by the third shifter 67.

A speed reducing gear train 71 including a starter driven gear 70 relatively rotatably borne on the crankshaft 14 and a starting one-way clutch 72 interposed between the starter driven gear 70 and the crankshaft 14 so as to permit power transmission from the starter driven gear 70 to the side of the crankshaft 14 are provided between the starter motor 34, which is mounted to the third crankcase cover 25 of the engine body 13, and the crankshaft 14.

The speed reducing gear 71 is composed of a starter drive gear 73 provided on an output shaft of the starter motor 34, a first idle gear 74 meshing with the starter drive gear 73, a second idle gear 75 formed integrally with the first idle gear 74, and the starter driven gear 70 meshing with the second idle gear 75. Both end portions of a support shaft 76 supporting the first and second idle gears 74 and 75, formed as one body, are supported by the case half 15b of the crankcase 15 and the third crankcase cover 25.

In addition, a power transmitting gear 77 meshing with the starter driven gear 70 is relatively rotatably borne on the first main shaft 44 through a running one-way clutch 78, which is provided for permitting power transmission from the power transmitting gear 77 to the side of the first main shaft 44 of the transmission M, and a ball bearing 79.

Figure 2:
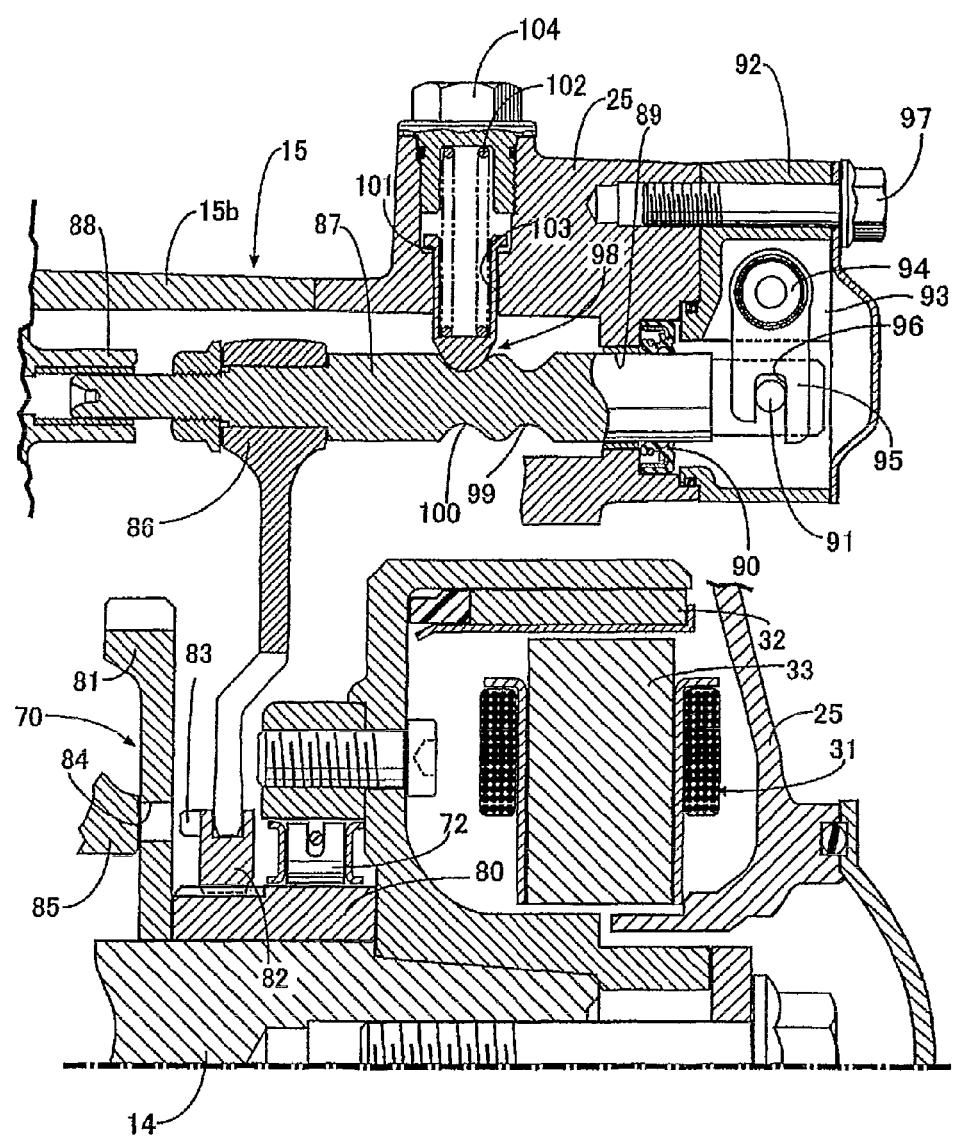
FIG. 2 is an enlarged sectional view taken along line 2-2 of FIG. 1.

Referring to FIG. 2, the starter driven gear 70 includes a tubular rotary member 80 which is relatively rotatably borne on the crankshaft 14, with the starting one-way clutch 72 interposed between the rotary member 80 and the rotor 32 of the generator 31 fixed to the crankshaft 14, a gear member 81 which is relatively rotatably borne on the crankshaft 14 and meshes with the power transmitting gear 77, and a shifter 82 which is borne on the rotary member 80 so as to be capable of relative movement in the direction along the axis of the crankshaft 14 and to be incapable of relative rotation. The shifter 82 integrally has a dog 83 which is disengageably engaged with an engaging hole 84 provided in the gear member 81.

The gear member 81, circular disc-like in shape, is relatively rotatably borne on the crankshaft 14 between one end of the rotary member 80 and the case half 15b of the, crankcase 15. The other end of the rotary member 80 abuts on the rotor 32 of the generator 31. The case half 15b is integrally provided with an annular projected portion 85 projected toward the gear member 81 so as to clamp the rotary member 80 and the gear member 81 between the annular projected portion 85 and the rotor 32.

The shifter 82 is embraced by a shift fork 86. The shift fork 86 is fixed to a shifter shaft 87 which has an axis parallel to the first main shaft 44, the second main shaft 45 and the counter shaft 46. One end portion of the shifter shaft 87 is axially slidably fitted in a support tube portion 88 provided on the case half 15b of the crankcase 15. The third crankcase cover 25 is provided with a support hole 89 through which the shifter shaft 87 is slidably passed, with an annular seal member 90 interposed between the third crankcase cover 25 and the shifter shaft 87.

A portion, protruding from the third crankcase cover 25, of the shifter shaft 87 is provided with a pin 91 having an axis orthogonal to the axis of the shifter shaft 87. In addition, a case 92 is fastened to the third crankcase cover 25 by a plurality of bolts 97 so as to cover that portion of the shifter shaft 87 which protrudes from the third crankcase cover 25. A stepping motor 93 having an output shaft 94 having a rotational axis parallel to the pin 91 is fixed to the case 92, a base end portion of a lever 95 is fixed to the output shaft 94, and a tip portion of the lever 95 is provided with an engaging recess 96 for engagement with the pin 91.

With the output shaft 94 turned, the shifter shaft 87 with the shift fork 86 fixed thereto is driven in the axial direction, whereby the shifter 82 of the starter driven gear 70 is slid between a connection position at which the dog 83 is engaged with the engaging hole 84 to connect the rotary member 80 with the gear member 81 in a relatively non-rotatable manner and a disconnection position at which the dog 83 is disengaged from the engaging hole 84 to permit relative rotation of the rotary member 80 and the gear member 81.

A click mechanism 98 is provided between the shifter shaft 87 and the third crankcase cover 25. The click mechanism 98 includes first and second annular recesses 99 and 100 which are provided in the outer periphery of the shifter shaft 87 at an interval along the axial direction, an engaging member 101 which is slidably fitted in a slide hole 103 provided in the third crankcase cover 25 in a direction orthogonal to the axis of the shifter shaft 87 and which is formed in the shape of a bottomed hollow cylinder closed on the side of the shifter shaft 87, and a click spring 102 which urges the closed end of the engaging member 101 toward the contact with the outer periphery of the shifter shaft 87.

A cap member 104 for closing the outer end of the slide hole 103 in an air-tight manner is screw-engaged with the third crankcase cover 25, and the click spring 102 is disposed in a compressed state between the cap member 104 and the engaging member 101.

Now, the operation of Example 1 will be described below. The speed reducing gear train 71 inclusive of the starter driven gear 70 borne on the crankshaft 14 in a relatively rotatable manner and the starting one-way clutch 72 interposed between the starter driven gear 70 and the crankshaft 14 so as to permit power transmission from the starter driven gear 70 to the side of the crankshaft 14 are provided between the starter motor 34 and the crankshaft 14. In addition, the power transmitting gear 77 meshing with the starter driven gear 70 is borne on the first main shaft 44 in a relatively rotatable manner, through the running one-way clutch 78 for permitting power transmission from the power transmitting gear 77 to the side of the first main shaft 44 of the transmission M.

Therefore, in the condition where the starter driven gear 70 is driven to rotate by an operation of the starter motor 34 and where the rotating speed of the power transmitting gear 77 meshing with the starter driven gear 70 is higher than the rotating speed of the first main shaft 44 rotated by the power transmitted from the crankshaft 14, the rotational power can be imparted from the power transmitting gear 77 to the first main shaft 44. Consequently, both driving of the vehicle by the starter motor 34 and power assisting by the starter motor 34 can be performed. Thus, the power unit P can be configured to be of a hybrid type with a simple structure, without the addition of a large number of component parts.

In addition, since the first hydraulic clutch 52 for changeover between power transmission from the crankshaft 14 to the first main shaft 44 and cutoff of the power transmission is provided between the crankshaft 14 and the first main shaft 44, a condition where the vehicle is driven by only the driving force of the starter motor 34 can be realized by setting the first hydraulic clutch 52 into the power transmission cutting-off state.

Moreover, the starter driven gear 70 is composed of the rotary member 80 which is borne on the crankshaft 14 in a relatively rotatable manner, with the starting one-way clutch 72 interposed between the starting driven gear 70 and the crankshaft 14, the gear member 81 which is relatively rotatably borne on the crankshaft 14 and meshes with the power transmitting gear 77, and the shifter 82 which is borne on the rotary member 80 so as to be capable of relative movement in the direction along the axis of the crankshaft 14 and to be incapable of relative rotation and which has a dog 83 which is disengageably engaged with the gear member 81. This ensures that a condition where the rotary member 80 and the gear member 81 are connected with each other in a relatively non-rotatable manner and a condition where these members are disconnected from each other can be changed over from one to the other, the power transmission from the starter motor 34 to the crankshaft 14 can be cut off, and the influence of friction on the side of the engine E can be minimized in the condition where the vehicle is driven by only the driving force of the starter motor 34.

The operating conditions of each part of the power unit P from the time of starting the engine E to the time of running of the vehicle will be described sequentially. First, at the time of starting the engine E, the transmission M is set into a neutral state, the first and second hydraulic clutches 52 and 53 are each set into a power transmission cutting-off state, the rotary member 80 and the gear member 81 of the starter driven gear 70 are connected to each other in a relatively non-rotatable manner, and, in this condition, the starter motor 34 is operated. As a result, rotational power from the starter motor 34 is inputted to the crankshaft 14 through the speed reducing gear train 71 and the starting one-way clutch 72, and the rotational power is transmitted from the starter driven gear 70 in the speed reducing gear train 71 to the first main shaft 44 in the transmission M through the power transmitting gear 77 and the running one-way clutch 78. In this case, the first main shaft 44 is only rotated idly, since the transmission M is in the neutral state.

Next, at the time of idling with the rotating speed of the engine E set at, for example, about 1400 rpm, the operation of the starter motor 34 is stopped while maintaining the condition where the transmission M is in the neutral state and the first and second hydraulic clutches 52 and 53 are in the power transmission cutting-off state.

At the time of performing power assisting by the starter motor 34 during extremely low rotation with the rotating speed of the engine E set at, for example, 1400 to 1500 rpm, the first hydraulic clutch 52 is set into a power transmitting state, a gear train, e.g., the first-speed gear train G1 in the transmission M is established, the rotary member 80 and the gear member 81 of the starter driven gear 70 are connected with each other in a relatively non-rotatable state, and, in this condition, the starter motor 34 is operated. As a result, because of the rotating speed of the crankshaft 14 is higher than the rotating speed of the starter driven gear 70, the starting one-way clutch 72 rotates idly without transmitting the rotational power of the starter driven gear 70 to the crankshaft 14, and the rotational power of the starter driven gear 70 is transmitted to the first main shaft 44 through the power transmitting gear 77 and the running one-way clutch 78. On the other hand, due to the rotation of the first main shaft 44, the drive gear 39 connected to the first main shaft 44 through the first hydraulic clutch 52, the rubber damper 51 and the driven gear 50 is also rotated, and the rotating speed of the drive gear 39 becomes higher than the rotating speed of the crankshaft 14, whereby the one-way clutch 30 is put into a locked state. Therefore, the rotational power of the crankshaft 14 is also transmitted to the first main shaft 44 through the one-way clutch 30, the drive gear 39, the driven gear 50, the rubber damper 51 and the first hydraulic clutch 52. Accordingly, the rotational power assisted by the starter motor 34 is transmitted through the first-speed gear train G1 to the counter shaft 46, and is further transmitted through the drive gear 63 and the driven gear 64, to be outputted from the output shaft 58.

At the time of performing power assisting by the starter motor 34 during low rotation with the rotating speed of the engine E set in the range of, for example, 1500 to 2500 rpm, like at the time of power assisting during the extremely low rotation mentioned above, the first hydraulic clutch 52 is set in the power transmitting state, a gear train, e.g., the first-speed gear train G1 in the transmission M is established, the rotary member 80 and the gear member 81 of the starter driven gear 70 are connected with each other in a relatively non-rotatable manner, and, in this condition, the operation of the starter motor 34 is continued. As a result, because of the rotating speed of the crankshaft 14 is higher than the rotating speed of the starter driven gear 70, the starting one-way clutch 72 does not transmit the rotational power of the starter driven gear 70 to the crankshaft 14, and the rotational power of the starter driven gear 70 is transmitted through the power transmitting gear 77 and the running one-way clutch 78 to the first main shaft 44. On the other hand, the rotating speed of the crankshaft 14 becomes higher than the rotating speed of the drive gear 39, so that the one-way clutch 30 does not transmit power between the crankshaft 14 and the drive gear 39, but the centrifugal clutch 29 is put into sliding engagement. Therefore, the rotational power of the crankshaft 14 is transmitted through the centrifugal clutch 29 in the sliding engagement, the drive gear 39, the driven gear 50, the rubber damper 51 and the first hydraulic clutch 52 to the first main shaft 44. Accordingly, the rotational power assisted by the starter motor 34 is transmitted through the first-speed gear train G1 to the counter shaft 46, and is further transmitted through the drive gear 63 and the driven gear 64, to be outputted from the output shaft 58.

In addition, during the low rotation with the rotating speed of the engine E set in the range of, for example, 1500 to 2500 rpm, the power assisting by the starter motor 34 can also be performed by setting the second hydraulic clutch 53 into the power transmitting state and establishing the first-speed gear train G1 and the second-speed gear train G2 in the transmission M. In this case, also, the operation of the starter motor 34 is continued in the condition where the rotary member 80 and the gear member 81 of the starter driven gear 70 are connected with each other in a relatively non-rotatable state. As a result, because the rotating speed of the crankshaft 14 is higher than the rotating speed of the starter driven gear 70, the starting one-way clutch 72 does not transmit the rotational power of the starter driven gear 70 to the crankshaft 14, and the rotational power of the starter driven gear 70 is transmitted through the power transmitting gear 77 and the running one-way clutch 78 to the first main shaft 44. On the other hand, the rotating speed of the crankshaft 14 becomes higher than the rotating speed of the drive gear 39, so that the one-way clutch 30 does not transmit power between the crankshaft 14 and the drive gear 39, but the centrifugal clutch 29 is put into sliding engagement. Consequently, the rotational power of the crankshaft 14 is transmitted through the centrifugal clutch 29 in the sliding engagement, the drive gear 39, the driven gear 50, the rubber damper 51 and the second hydraulic clutch 53 to the second main shaft 45. Therefore, in addition to the power transmitted from the crankshaft 14 to the counter shaft 46 through the second-speed gear train G2, the assisting power supplied from the starter motor 34 is transmitted through the first-speed gear train G1 to the counter shaft 46, and the rotational power of the counter shaft 46 is transmitted through the drive gear 63 and the driven gear 64, to be outputted from the output shaft 58.

At the time of performing power assisting by the starter motor 34 during normal running with the rotating speed of the engine E set at, for example, more than 2500 rpm, like at the time of power assisting during the low rotation mentioned above, the first hydraulic clutch 52 is set into the power transmitting state, either of the first-speed and third-speed gear trains G1 and G3 in the transmission M is established, the rotary member 80 and the gear member 81 of the starter driven gear 70 are connected with each other in a relatively non-rotatable manner, and, in this condition, the operation of the starter motor 34 is continued. As a result, because the rotating speed of the crankshaft 14 is higher than the rotating speed of the starter driven gear 70, the starting one-way clutch 72 does not transmit the rotational power of the starter driven gear 70 to the crankshaft 14, and the rotational power of the starter driven gear 70 is transmitted through the power transmitting gear 77 and the running one-way clutch 78 to the first main shaft 44. On the other hand, the rotating speed of the crankshaft 14 becomes higher than the rotating speed of the drive gear 39, so that the one-way clutch 30 does not transmit power between the crankshaft 14 and the drive gear 39, but the centrifugal clutch 29 is engaged, namely, set into a power transmitting state. Therefore, the rotational power of the crankshaft 14 is transmitted through the centrifugal clutch 29 in the power transmitting state, the drive gear 39, the driven gear 50, the rubber damper 51 and the first hydraulic clutch 52 to the first main shaft 44. Accordingly, the rotational power assisted by the starter motor 34 is transmitted through either of the first-speed and third-speed gear trains G1 and G3 to the counter shaft 46, and is further transmitted through the drive gear 63 and the driven gear 64, to be outputted from the output shaft 58.

At the time of not performing the power assisting by the starter motor 34 during the normal running with the rotating speed of the engine E set at, for example, more than 2500 rpm, it suffices to stop the operation of the starter motor 34. In this case, the running clutch 78 does not transmit power from the first main shaft 44 being rotated by the rotational power, which is transmitted from the crankshaft 14, to the side of the power transmitting gear 77, namely, to the side of the starter motor 34.

Furthermore, at the time of driving the vehicle by only the power supplied from the starter motor 34, the rotary member 80 and the gear member 81 of the starter driven gear 70 are disconnected from each other to be put into a relatively rotatable state, the first hydraulic clutch 52 is put into a power transmission cutting-off state, either of the first-speed and third-speed gear trains G1 and G3 in the transmission M is established, and, in this condition, the starter motor 34 is operated. As a result, the rotational power of the starter driven gear 70 is transmitted through the gear member R1 of the starter driven gear 70, the power transmitting gear 77 and the running one-way clutch 78 to the first main shaft 44, and the rotational power transmitted to the counter shaft 46 through either of the first-speed and the third-speed gear trains G1 and G3 is transmitted through the drive gear 63 and the driven gear 64, to be outputted from the output shaft 58.

In this case, since the first hydraulic clutch 52 is in the power transmission cutting-off state, the rotational power of the first main shaft 44 is not transmitted to the side of the crankshaft 14. In addition, since the gear member 81 of the starter driven gear 70 is in the state of having been disconnected from the rotary member 80, the rotational power supplied from the starter motor 34 is not transmitted to the side of the crankshaft 14, so that the influence of friction on the side of the engine E can be minimized.

While the embodiment of the present invention has been described above, the invention is not limited to the above embodiment, and various design modifications are possible within the scope of the invention as described in the claims.

For instance, if the influence of friction on the side of the engine E is not taken into account at the time of driving the vehicle by only the power supplied from the starter motor 34, the starter driven gear may be formed to have a structure in which the rotary member and the gear member are integral with each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle power unit comprising:
a speed reducing gear train including a starter driven gear selectively rotatably mounted on a crankshaft, said crankshaft being rotatably mounted on a crankcase constituting part of an engine body;
a starting one-way clutch interposed between the starter driven gear and the crankshaft so as to permit power transmission from the starter driven gear to the side of the crankshaft, the speed reducing gear train and the starting one-way clutch being provided between a starter motor mounted to the engine body and the crankshaft;
a transmission accommodated in the crankcase, the transmission having gear trains for a plurality of gear speeds which can be selectively established, the gear trains being provided between a main shaft and a counter shaft which have axes parallel to the crankshaft; and
a power transmitting gear meshing with the starter driven gear is selectively rotatably mounted on the main shaft through a running one-way clutch to transmit rotation from the power transmitting gear to the main shaft, wherein the starter driven gear includes a rotary member selectively rotatably mounted on the crankshaft through the starting one-way clutch interposed between the rotary member and the crankshaft, a gear member selectively rotatably mounted on the crankshaft and meshing with the power transmitting gear and a shifter mounted on the rotary member to be axially movable in a direction along the axis of the crankshaft and to be incapable of rotation, said shifter including a dog selectively engagable and disengagable with the gear member.

2. The vehicle power unit according to claim 1, wherein a power transmission change-over mechanism for change-over between power transmission from the crankshaft to the main shaft and cutoff of the power transmission is provided between the crankshaft and the main shaft.

3. The vehicle power unit according to claim 1, wherein the speed reducing gear train includes a starter drive gear operatively mounted on an output shaft of the starter motor, a first idle gear meshing with the starter drive gear, a second idle gear formed integrally with the first idle gear and the starter driven gear meshing with the second idle gear.

4. The vehicle power unit according to claim 3, and further including a support shaft for operatively mounting the first and second idle gears, formed as one body, wherein one end portion of the support shaft is supported by the crankcase and the other end portion of the support shaft is supported by a crankcase cover.

5. The vehicle power unit according to claim 1, wherein the gear member is operatively mounted on the crankshaft between one end of the rotary member and a case half of the crankcase with the other end of the rotary member abutting a rotor of a generator.

6. The vehicle power unit according to claim 5, wherein the case half of the crankshaft is integrally provided with an annular projecting portion extending towards the gear member for clamping the rotary member and the gear member between the annular projecting portion and the rotor.

7. The vehicle power unit according to claim 1, wherein the shifter includes a shift fork fixed to a shifter shaft mounted on an axis extending parallel to the main shaft, one end portion of the shifter shaft being axially slidably fitted in a support tube portion provided on a case half of the crankcase, a third crankcase cover is provided with a support aperture through which the shifter shaft is slidably passed with an annular seal being interposed between the third crankcase cover and the shifter shaft.

8. A vehicle power unit comprising:
a speed reducing gear train including a starter driven gear relatively rotatably borne on a crankshaft, said crankshaft being rotatably mounted relative to a crankcase;
a starting one-way clutch interposed between the starter driven gear and the crankshaft for permitting power transmission from the starter driven gear to the side of the crankshaft, said speed reducing gear train and the starting one-way clutch being provided between a starter motor and the crankshaft;
a transmission accommodated in the crankcase, said transmission having gear trains for a plurality of gear speeds which can be selectively established, the gear trains being provided between a main shaft and a counter shaft which have axes parallel to the crankshaft;
a power transmitting gear meshing with the starter driven gear is selectively rotatably mounted on the main shaft through a running one-way clutch to transmit rotation from the power transmitting gear to the main shaft; and
said starter driven gear includes a rotary member selectively rotatably mounted on the crankshaft through the starting one-way clutch interposed between the rotary member and the crankshaft, a gear member selectively rotatably mounted on the crankshaft and meshing with the power transmitting gear, and a shifter mounted on the rotary member to be axially movement in a direction along the axis of the crankshaft and to be incapable of rotation, said shifter including a dog selectively engagable and disengageable with the gear member.

9. The vehicle power unit according to claim 8, wherein a power transmission change-over mechanism for change-over between power transmission from the crankshaft to the main shaft and cutoff of the power transmission is provided between the crankshaft and the main shaft.

10. The vehicle power unit according to claim 8, wherein the speed reducing gear train includes a starter drive gear operatively mounted on an output shaft of the starter motor, a first idle gear meshing with the starter drive gear, a second idle gear formed integrally with the first idle gear and the starter driven gear meshing with the second idle gear.

11. The vehicle power unit according to claim 10, and further including a support shaft for operatively mounting the first and second idle gears, formed as one body, wherein one end portion of the support shaft is supported by the crankcase and the other end portion of the support shaft is supported by a crankcase cover.

12. The vehicle power unit according to claim 8, wherein the gear member is operatively mounted on the crankshaft between one end of the rotary member and a case half of the crankcase with the other end of the rotary member abutting a rotor of a generator.

13. The vehicle power unit according to claim 12, wherein the case half of the crankshaft is integrally provided with an annular projecting portion extending towards the gear member for clamping the rotary member and the gear member between the annular projecting portion and the rotor.

14. The vehicle power unit according to claim 8, wherein the shifter includes a shift fork fixed to a shifter shaft mounted on an axis extending parallel to the main shaft, one end portion of the shifter shaft being axially slidably fitted in a support tube portion provided on a case half of the crankcase, a third crankcase cover is provided with a support aperture through which the shifter shaft is slidably passed with an annular seal being interposed between the third crankcase cover and the shifter shaft.

* * * * *